(12) United States Patent
Jacobson et al.

(10) Patent No.: US 9,389,335 B2
(45) Date of Patent: Jul. 12, 2016

(54) PULSED NEUTRON TOOL FOR DOWNHOLE OIL TYPING

(71) Applicant: Halliburton Energy Services, Inc., Houston, TX (US)

(72) Inventors: Larry Jacobson, Richmond, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/342,294

(22) PCT Filed: May 17, 2013

(86) PCT No.: PCT/US2013/041685
§ 371 (c)(1),
(2) Date: Feb. 28, 2014

(87) PCT Pub. No.: WO2014/185932
PCT Pub. Date: Nov. 20, 2014

(65) Prior Publication Data
US 2015/0083905 A1    Mar. 26, 2015

(51) Int. Cl.
*G01V 5/10*    (2006.01)
(52) U.S. Cl.
CPC ............... *G01V 5/105* (2013.01); *G01V 5/101* (2013.01)
(58) Field of Classification Search
CPC ........................................................ G01V 5/101
USPC ....................................................... 250/269.6
See application file for complete search history.

(56) References Cited

U.S. PATENT DOCUMENTS

| 2,231,577 A | 2/1941 | Hare |
| 3,081,401 A | 3/1963 | Wilson |
| 4,028,546 A | 6/1977 | Peelman et al. |
| 4,122,341 A | 10/1978 | Smith, Jr. |
| 4,129,777 A | 12/1978 | Wahl et al. |
| 5,001,342 A | 3/1991 | Rambow |
| 5,578,820 A | 11/1996 | Gadeken et al. |

(Continued)

FOREIGN PATENT DOCUMENTS

| EP | 0443936 | 8/1991 |
| EP | 2426516 | 3/2012 |

(Continued)

OTHER PUBLICATIONS

International Search Report and Written Opinion of the International Searching Authority issued in International Application No. PCT/US2013/041685 on Feb. 5, 2014; 11 pages.

(Continued)

*Primary Examiner* — Christine Sung
(74) *Attorney, Agent, or Firm* — Benjamin Fite; Fish & Richardson P.C.

(57) ABSTRACT

Methods for determining a value indicative of liquid density of a formation include obtaining an inelastic count rate and a capture count rate of a gamma detector for a particular borehole depth, calculating a ratio of an inelastic count rate to a capture count rate for the particular borehole depth, determining a value indicative of liquid density based on the ratio of the inelastic count rate to the capture count rate for the particular borehole depth, repeating the obtaining, calculating and determining for a plurality of borehole depths, and producing a plot of the value indicative of liquid density of the formation as a function of borehole depth.

23 Claims, 7 Drawing Sheets

(56) References Cited

U.S. PATENT DOCUMENTS

| | | | |
|---|---|---|---|
| 5,783,822 | A | 7/1998 | Buchanan et al. |
| 8,346,481 | B2 | 1/2013 | Jacobson et al. |
| 2002/0014583 | A1 | 2/2002 | Bothner |
| 2007/0143021 | A1* | 6/2007 | Griffiths et al. ............ 702/6 |
| 2008/0156977 | A1 | 7/2008 | Jeffryes |
| 2009/0026359 | A1* | 1/2009 | Stephenson et al. ....... 250/269.7 |
| 2010/0224773 | A1 | 9/2010 | Galford et al. |
| 2011/0137566 | A1 | 6/2011 | Jacobson et al. |
| 2011/0202276 | A1* | 8/2011 | Truax et al. ................ 702/6 |
| 2011/0257948 | A1 | 10/2011 | McDaniel |
| 2012/0016588 | A1* | 1/2012 | Evans et al. ................ 702/8 |
| 2012/0068060 | A1 | 3/2012 | Chace et al. |
| 2012/0075953 | A1 | 3/2012 | Chace et al. |
| 2012/0091329 | A1 | 4/2012 | Chace et al. |
| 2013/0048849 | A1 | 2/2013 | Li et al. |

FOREIGN PATENT DOCUMENTS

| | | |
|---|---|---|
| WO | WO 2010/123494 | 10/2010 |
| WO | WO 2013/012504 | 1/2013 |

OTHER PUBLICATIONS

Halliburton, "TMD3D™ (Thermal Multigate Decay—3 Detector) Logging Tool," H09044, Jul. 2012, 2 pages.

Prensky et al., "What's new in well logging and formation evaluation," Petrophysical Technology, World Oil, vol. 232, No. 6, Jun. 2011, 8 pages.

Weatherford®, "Pulsed Neutron Decay (PND®) Spectrum Tool," 3730.03, ©2006-2011, 2 pages.

Baker Hughes, "Reservoir Performance Monitor (RPM)," 30103 T, 2010, 8 pages.

Halliburton, "RMT Elite™ Reservoir Monitor Tool," H02621, Jan. 2008, 4 pages.

Halliburton, "Thermal Multigate Decay-Lithology (TMD-L™)," H01190, Jan. 2008, 2 pages.

Haines et al., "Downhole Data Captured," Oil and Gas Investor an Investor guide, Hart Energy Publishing LP, Aug. 21, 2006, 4 pages.

Shclumberger, "RSTPro," 06-PR-001, Jul. 2006, 8 pages.

Halliburton, "Reservoir Monitor Tool Elite (RMT-E™)," D00132943, 2003, 2 pages.

North et al., "Through-Casing Reservoir Evaluation Using Gamma Ray Spectroscopy", SPE 16356, Society of Petroleum Engineers of AIME, Apr. 8- 10, 1987, 14 pages.

Anderson et al., "Acoustic Cement Bond Logging," Society of Petrophysicists and Well-Log Analysts. 1961, 15 pages.

"Heavy Crude Oil", Wikipedia, last modified Jun. 12, 2015, retrieved from internet on Jun. 22, 2015, https://en.wikipedia.org/w/index.php?title=Heavy_crude_oil&oldid=666596324, 5 pages.

"Light Crude Oil", Wikipedia, last modified Sep. 13, 2014, retrieved from internet on Jun. 22, 2015, https://en.wikipedia.org/w/index.php?title=Light_crude_oil&oldid=625430646, 3 pages.

PCT International Preliminary Report on Patentability, PCT/US2013/041685, Nov. 26, 2015, 8 pages.

\* cited by examiner

US 9,389,335 B2

PULSED NEUTRON TOOL FOR DOWNHOLE OIL TYPING

CLAIM OF PRIORITY

This application is a U.S. National Stage of PCT/US2013/041685 filed on May 17, 2013.

TECHNICAL FIELD

This invention relates to well logging, and more particularly to determining characteristics of formations in and around a borehole.

BACKGROUND

Well logging is a technique used to identify characteristics of earth formations surrounding a borehole. The interrogation of a formation surrounding a borehole to identify one or more characteristics may be by sound, electrical current, electromagnetic waves, or high energy nuclear particles (e.g., gamma particles and neutrons). Receiving the interrogating particle or signal, and determining a formation property from such particle or signal, is in many cases, a complicated endeavor sometimes involving detecting the interrogating particles or signals at multiple detectors on a logging tool. Any system or method that simplifies the detection of interrogating particle or signals, and thus simplifies determination of formation property, provides a competitive advantage in the marketplace.

NOTATION AND NOMENCLATURE

Certain terms are used throughout the following description and claims to refer to particular system components. Oilfield service companies may refer to a component by different names. This document does not intend to distinguish between components that differ in name but not function.

In the following discussion and in the claims, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms (e.g., elemental or bonded), and in particular atomic nuclei, and shall include such energy whether such energy is considered a particle (i.e., gamma particle) or a wave (i.e., gamma ray or wave).

"Gamma count rate decay curve" shall mean, for a particular gamma detector, a plurality of count values, each count value based on gammas counted during a particular time bin and/or having particular energy. The count values may be adjusted up or down to account for differences in the number of neutrons giving rise to the gammas or different tools, and such adjustment shall not negate the status as a "gamma count rate decay curve."

"Inelastic count rate" shall mean a gamma count rate during periods of time when gammas created by inelastic collisions are the predominant gammas created and/or counted (e.g., during the neutron burst period). The minority presence of counted capture gammas shall not obviate a count rate's status as an inelastic count rate.

"Capture count rate" shall mean a gamma count rate during periods of time when gammas created by thermal neutron capture are the predominant gammas created and/or counted (e.g., periods of time after the neutron burst period). The minority presence of counted inelastic gammas shall not obviate a count rate's status as capture count rate.

"Spacing", as between a neutron source and a gamma detector, shall mean a distance measured from a geometric center of the neutron source to a geometric center of a scintillation crystal of the gamma detector.

DESCRIPTION OF DRAWINGS

Like reference symbols in the various drawings indicate like elements.

DETAILED DESCRIPTION

Embodiments of wireline logging tools are described below. While the various embodiments were developed in the context of wireline logging tools, the various systems and methods find application not only in wireline logging tools, but also measuring-while-drilling (MWD) and logging-while-drilling tools (LWD). Further still, the various embodiments also find application in "slickline" tools or coiled tubing. In one or more of these applications, the logging tool is placed downhole (e.g., as part of a drill string, or as a standalone device), and the logging tool gathers data that is stored in a memory within the device (i.e., possibly not all the gathered data is immediately telemetered to the surface). Once a tool with memory is brought back to the surface, the data can be downloaded, some or all the processing can take place, and the logging data can be printed or otherwise displayed. Thus, the developmental context shall not be construed as a limitation as to the applicability of the various embodiments.

In general, the embodiments are directed to making determinations as to liquid density of underground formations based on a neutron-gamma tool. For example, during the construction and operation of a well, operators may wish to assess the density of a liquid hydrocarbon within a reservoir or geological formation surrounding the wellbore, such that a hydrocarbon can be identified and differentiated from other hydrocarbons. In certain embodiments, this need is addressed, at least in part, by a system and method of determining a value indicative of liquid density based on the gamma count rates from single gamma detector. The specification first turns to an illustrative system.

Figure 1:
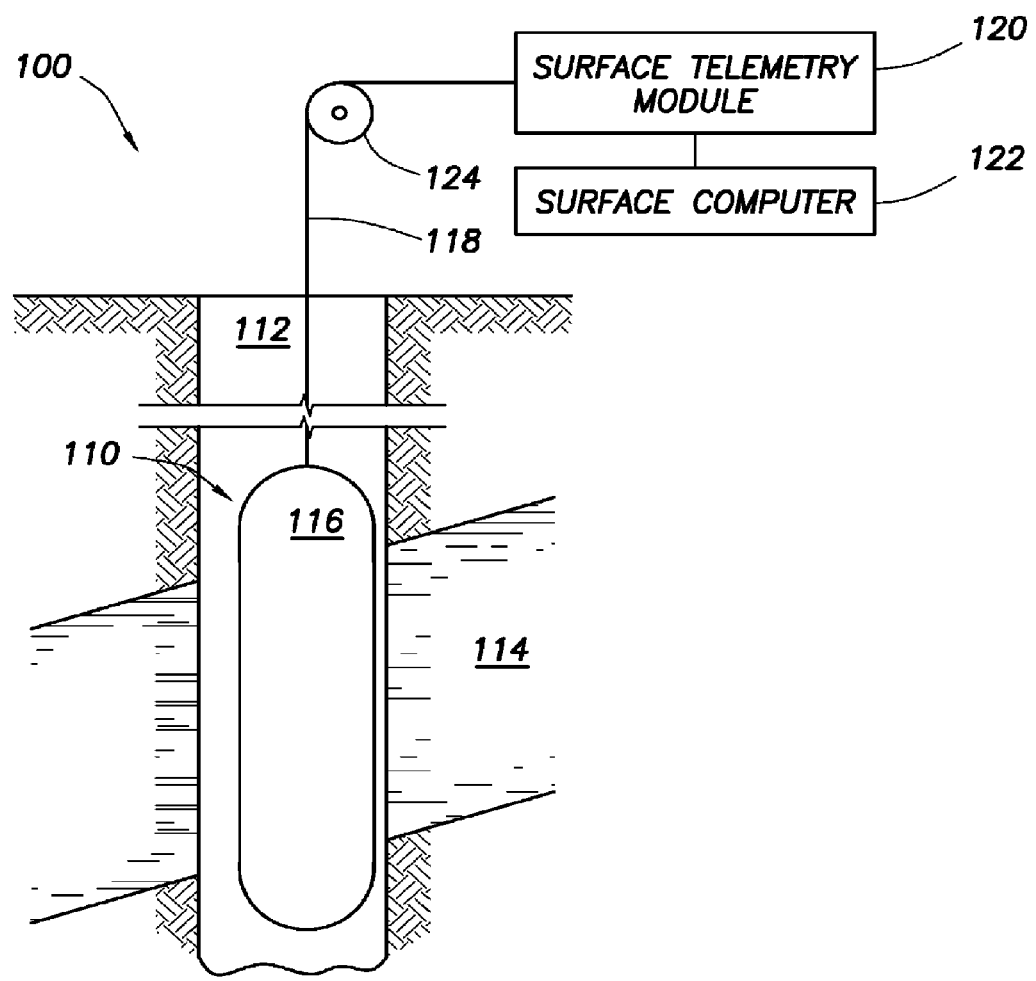
FIG. 1 shows an embodiment of a nuclear logging system.

FIG. 1 shows an embodiment of a nuclear logging system 100. In particular, system 100 includes a logging tool 110 placed within a borehole 112 proximate to a formation 114 of interest. The tool 110 includes a pressure vessel 116 within which various subsystems of the tool 110 reside, and in the illustrative case of FIG. 1 the pressure vessel 116 is suspended within the borehole 112 by a cable 118. Cable 118, in some embodiments a multi-conductor armored cable, not only provides support for the pressure vessel 116, but also in these embodiments communicatively couples the tool 110 to a surface telemetry module 120 and a surface computer 122. The tool 110 may be raised and lowered within the borehole 112 by way of the cable 118, and the depth of the tool 110 within the borehole 112 may be determined by depth measurement system 124 (illustrated as a depth wheel).

Figure 2:
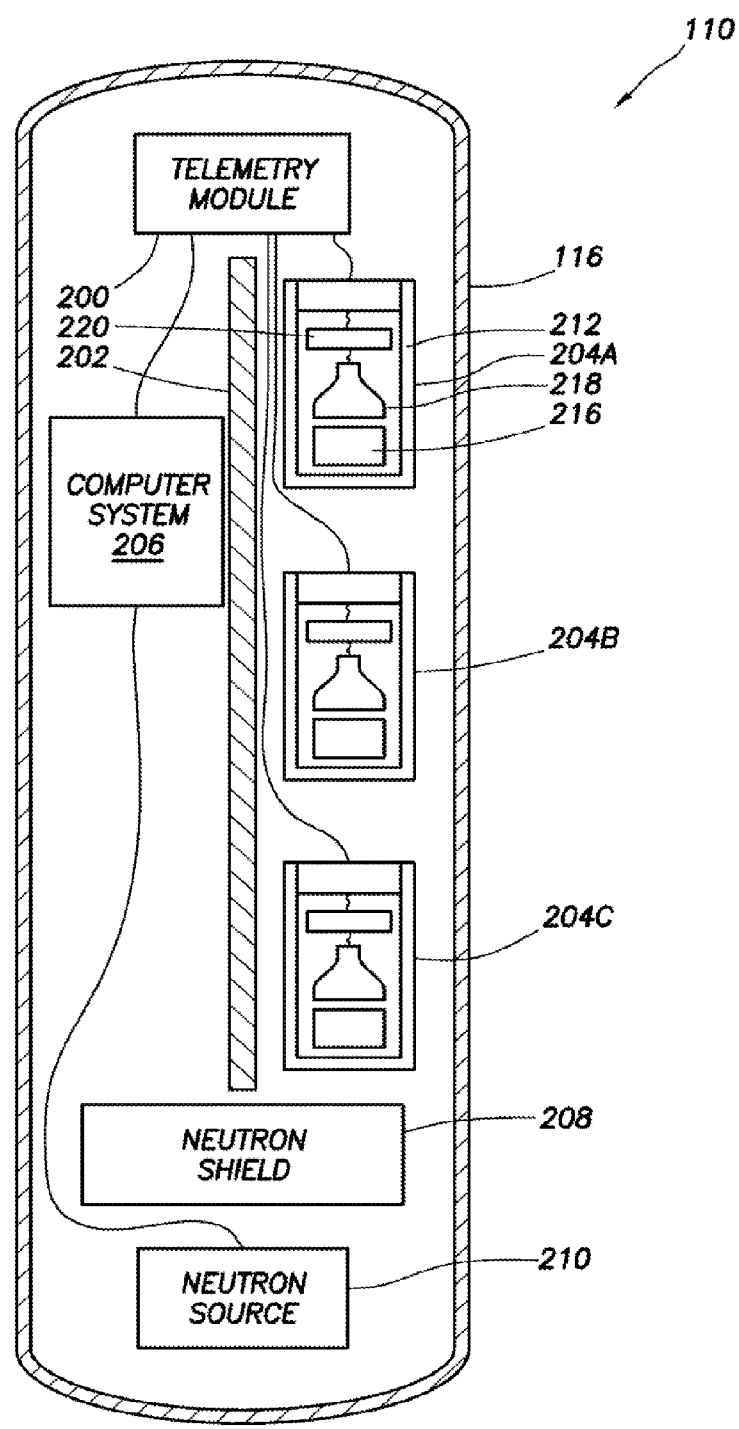
FIG. 2 shows a simplified cross-section view of an embodiment of a logging tool.

FIG. 2 shows a simplified cross-sectional view of the logging tool 110 to illustrate the internal components in accordance with at least some embodiments. In particular, FIG. 2 illustrates that the pressure vessel 116 houses various components, such as a telemetry module 200, borehole shield 202, a plurality of gamma detectors 204 (in this illustrative case, a first gamma detector 204A, a second gamma detector 204B, and third gamma detector 204C), computer system 206, a neutron shield 208 and a neutron source 210. While the gamma detectors 204 are shown above the neutron source 210, in other embodiments the gamma detectors may be below the neutron source. Gamma detector 204C is generally positioned nearest to the neutron source, and may be on the order of 12 inches from the neutron source. Gamma detector 204B is generally positioned farther away from the neutron source than gamma detector 204C, and may be on the order of 24 inches from the neutron source 210. Gamma detector 204A is generally positioned the farthest from the neutron source relative to the other gamma detectors 204, and may be on the order of 32.5 to 36 inches from the neutron source 210. Other spacing may be equivalently used. Borehole shield 202 may make the gamma detectors 204 more favorably receive formation-sourced gammas (as opposed to borehole-sourced gammas), and the borehole shield 202 may be a high density material (e.g., a suitable metal, such as tungsten, or a suitable alloy, such as HEVIMET® available from General Electric Company of Fairfield, Conn.).

Pressure vessel 116 may vary in size and shape in order to accommodate particular applications and to support various component dimensions and layouts. For example, in some embodiments of tool 110 used in wireline applications, pressure housing 116 is generally tubular. The dimensions of the tube can vary. In certain embodiments, the housing 116 has an outer diameter of approximately 3⅝". In certain other embodiments, the housing 116 has an outer diameter of approximately 1¹¹⁄₁₆". The inner diameter of housing 116, and correspondingly the thickness of housing 116, can also vary. In some embodiments, housing 116 has an inner diameter of approximately ³⁄₁₆" or ⅜". In general, the inner and outer diameters of housing 116 may be varied to provide a particular pressure rating for the housing (e.g. a pressure rating of 16-20 kpsi).

Components of tool 110 are contained within pressure housing 116, including telemetry module 200, borehole shield 202, gamma detectors 204, computer system 206, a neutron shield 208 and a neutron source 210. In general, gamma detectors 204 are placed sufficiently far from neutron source 210 in order to reduce neutron exposure to gamma detectors 204, and sufficiently close to neutron source 210 to ensure that gamma detectors 204 are able to detect a sufficient number of gammas in order to produce a reliable measurement. For instance, gamma detectors 204 may be approximately 1-12 inches, 12-24 inches, 24-36 inches, and 36-48 inches from neutron source 210. In some embodiments, multiple gamma detectors 204 may be located at varying distances from neutron source 210. For instance, in some embodiments, gamma detectors 204A, 204B, and 204C are located approximately 33 inches, 24 inches, and 12 inches from neutron source 210, respectively. In some embodiments, the dimensions of pressure housing 116 may be larger, for instance for use with open-hole wireline applications, where a pipe casing has not yet been constructed within a wellbore. Likewise, the dimensions of pressure housing 116 may be smaller, such that it may be used within narrower well structures.

In some embodiments, pressure vessel 116 is shaped for mounting to a correspondingly shaped retaining structure. For instance, in certain embodiments of tool 110 used in LWD applications, pressure vessel 116 is shaped so that it may be fixed within a retaining structure of a drill string. Examples of possible retaining structures may include a correspondingly shaped channel or bracket located on a collar of the drill string. When mounted to the collar, tool 110 may be positioned in conjunction with the drill string and operated in conjunction with the operation of the drill string.

In some embodiments, pressure vessel 116 is shaped to further accommodate the components of other tools. For instance, tool 110 can be mounted onto a drill string collar, and pressure vessel 116 can contain a longitudinal channel that runs the length of tool 110. Materials that are excavated during the drilling process, such as rock, soil, mud, and liquid, pass through this channel on their way to the surface. In some embodiments, components of tool 110 are relocated within pressure vessel 116 in order to accommodate this channel. For instance, one or more of the components may be located along the inner periphery of pressure vessel 116. Similarly, pressure vessel 116 may include other channels in order to accommodate other components of other tools.

In some embodiments the neutron source 210 is a Deuterium/Tritium neutron generator. However, any neutron source capable of producing and/or releasing neutrons with sufficient energy (e.g., greater than 8 Mega-Electron Volt (MeV)) may equivalently used. The neutron source 210, under command from surface computer 122 in the case of wireline tools, or computer system 206 within the tool in the case of MWD, LWD or slickline tools, generates and/or releases energetic neutrons. In order to reduce the neutron exposure of the gamma detectors 204 and other devices by energetic neutrons from the neutron source 210, neutron shield 208 (e.g., a suitable metal, such as tungsten, or a suitable alloy, such as HEVIMET®) separates the neutron source 210 from the gamma detectors 204, and may span either all or part of an interior cross section of pressure housing 116. Because of the speed of the energetic neutrons (e.g., 30,000 kilometers/second or more), and because of collisions of the neutrons with atomic nuclei that change the direction of movement of the neutrons, a neutron flux is created around the logging tool 110 that extends into the formation 114.

Neutrons generated and/or released by the source 210 interact with atoms by way of inelastic collisions and/or thermal capture. In the case of inelastic collisions, a neutron inelastically collides with atomic nuclei, a gamma is created (an inelastic gamma), and the energy of the neutron is reduced. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine status as an inelastic gamma After one or more inelastic collisions (and corresponding loss of energy) a neutron reaches an energy known as thermal energy (i.e., a thermal neutron). At thermal energy a neutron can be captured by atomic nuclei. In a capture event the capturing atomic nucleus enters an excited state, and the nucleus later transitions to a lower energy state by release of energy in the form of a gamma (known as a thermal gamma). At least some of the thermal gammas created by thermal capture are also incident upon the gamma detectors 204. One or both of the arrival time of a particular gamma and its energy may be used to determine its status as a capture gamma. Only inelastic and thermal capture interactions produce gammas, however.

Still referring to FIG. 2, when operational the gamma detectors 204 detect arrival and energy of gammas. Referring to gamma detector 204A as indicative of all the gamma detectors 204, a gamma detector includes an enclosure 212, and within the enclosure 212 resides: a crystal 216 (e.g., a yttrium/gadolinium silicate scintillation crystal, sodium iodide scintillation crystal, lanthanum bromide scintillation crystal, or a bismuth germinate (BGO) scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 122 (as shown in FIG. 1) by way of the telemetry module 200 and/or to the computer system 206 within the tool.

In general, crystals 216 may vary in dimension based on the dimensions of tool 110, the arrangement and dimensions of the components of tool 110, and the desired detection sensitivity of gamma detectors 204. For instance, in some embodiments, crystals 216 have a detection face that is approximately 1 inch by 6 inches. In some embodiments, crystals 216 have a detection face that is approximately 1 inch by 1 inch. In some embodiments, each gamma detector 204 may have a crystal 216 with dimensions that are the same or different than that of a crystal 216 of another gamma detector 204. For instance, in some embodiments, tool 110 may include three gamma detectors 204, two with crystals 216 with detection faces of 1 inch by 6 inches, and one with crystal 216 with a detection face of 1 inch by 1 inch. Further, each gamma detector 204 may have a type of crystal 216 that is the same or different than a crystal 216 of another gamma detector 204. For instance, in some embodiments, tool 110 may include three gamma detectors 204, two with gadolinium yttrium silicate scintillation crystals, and one with a yttrium gadolinium silicate scintillation crystal.

Figure 3:
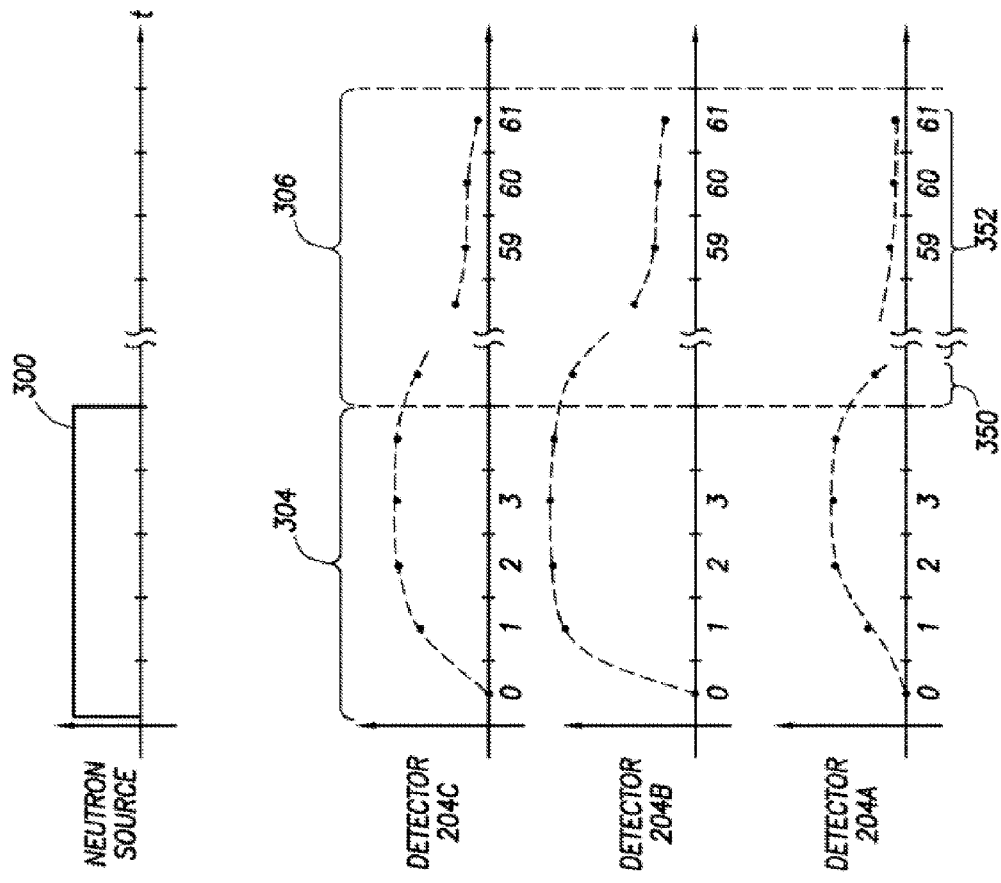
FIG. 3 shows graphs of count rate as a function of time in accordance with an embodiment of the nuclear logging system.

FIG. 3 shows several graphs as a function of corresponding time in order to describe how the gamma arrivals are recorded and characterized. In particular, FIG. 3 shows graphs relating to activation of the neutron source 210, as well as gamma count rates for the first detector 204A, the second detector 204B, and the third detector 204C. The graph with respect to the neutron source 210 is Boolean in the sense that it shows when the neutron source is generating and/or releasing neutrons (i.e., the burst period), and when the neutron source is not. In particular, with respect to the neutron source graph, the neutron source is generating and/or releasing neutrons during the asserted state 300, and the neutron source is off during the remaining time. In accordance with the various embodiments, a single interrogation (at a particular borehole depth) includes activating the neutron source for a predetermined amount of time (e.g., 80 microseconds) and counting the number of gamma arrivals by at least one of the detectors during the activation time of the neutron source and for a predetermined amount of time after the source is turned off. In at least some embodiments, the total amount of time for a single interrogation (i.e., a single firing of the neutron source and the predetermined amount of time after the neutron source is turned off) may span approximately 1250 microseconds (μs), but other times may be equivalently used.

Still referring to FIG. 3, with respect to counting gamma arrivals by the gamma detectors 204, the interrogation time is divided into a plurality of time slots or time bins. With reference to the graph for the first detector 204A as illustrative of all the gamma detectors, in some embodiments the interrogation time is divided into 61 total time bins. In accordance with at least some embodiments, the first 32 time bins each span 10 μs, the next 16 time bins each span 20 μs, and the remaining time bins each span 50 μs. Other numbers of time bins, and different time bin lengths, may be equivalently used. For instance, in some embodiments, the interrogation time is divided into 125 bins each with a 10 μs span. Each gamma that arrives within a particular time bin increases the count value of gammas within that time bin. While in some embodiments the actual arrival time of the gammas within the time bin may be discarded, in other embodiments the actual arrival may be retained and used for other purposes. Starting with time bin 0, the gamma detector counts the gamma arrivals and increases the count value for the particular time bin for each gamma arrival. Once the time period for the time bin expires, the system starts counting anew the arrivals of gammas within the next time bin until count values for all illustrative 61 time bins have been obtained. In some cases, the system starts immediately again by activating the neutron source and counting further time bins; however, the count values within each time bin (for a particular borehole depth) are recorded either by way of the surface computer 122 and/or by the computer system 206 within the tool.

Illustrative count values for each time bin are shown in FIG. 3 as dots in the center of each time bin. The count value for each time bin is represented by the height of the dot above the x-axis (i.e., the y-axis value). Taking all the count values for a particular detector together, the dots may be connected by an imaginary line (shown in dashed form in FIG. 3) to form a mathematical curve illustrative of the number of gamma arrivals as a function of time detected by the particular gamma detector. In accordance with the various embodiments, the plurality of count values is referred to as a gamma count rate decay curve. All the curves taken together (the curve for each gamma detector) may be referred to as full-set decay curves.

Because of the physics of the combined logging tool and surrounding formation, within certain time periods certain types of gammas are more likely to be created, and thus more likely to be counted by the one or more active gamma detectors 204. For example, during the period of time within which the neutron source 210 is activated (as indicated by square wave 300), the energy of neutrons created and/or released leads predominantly to creation of inelastic gammas. The period of time in the gamma count rate decay curves where the gammas are predominantly inelastic gammas is illustrated by time period 304. Thus, gammas counted during some or all of the time period 304 may be considered inelastic gammas, and the count rate may be referred to as an inelastic count rate. Some capture gammas may be detected during the time period 304, and in some embodiments the minority presence of capture gammas may be ignored. In yet still other embodiments, because capture gammas are distinguishable from inelastic gammas based on energy, and because the gamma detectors not only detect arrival of a gamma but also energy, the portion of the count rate during time period 304 attributable to capture gammas may be removed algorithmically.

Similarly, after the neutron source 210 is no longer activated, the average energy of the neutrons that make up the neutron flux around the tool 110 decreases, and the lower energy of the neutrons leads predominantly to creation of capture gammas. The period of time in the gamma count rate decay curves where the gammas are predominantly capture gammas is illustrated by time period 306. Thus, gammas counted during some or all of the time period 306 may be considered capture gammas, and the count rate may be referred to as a capture count rate. Some inelastic gammas may be detected during the time period 306, and in some embodiments the minority presence of inelastic gammas may be ignored. In yet still other embodiments, because inelastic gammas are distinguishable from capture gammas based on energy, the portion of the count rate during time period 306 attributable to inelastic gammas may be removed algorithmically.

The inventors have found that a gamma count rate decay curve from a single gamma detector may be used to determine a value indicative of liquid density of the formation 114 at the particular borehole depth for which the gamma count rate decay curve is determined. More particularly still, the inventors have found that a relationship between the inelastic count rate and the capture count rate of a gamma count rate decay curve is indicative of liquid density. Consider, as an example, a single gamma count rate decay curve, such as the first gamma detector 204A gamma count rate decay curve of FIG. 3. In accordance with the various embodiments, a ratio is taken of the inelastic count rate to the capture count rate of the gamma count rate decay curve. The inelastic count rate may be the summed count rate from one or more of the time bins within time period 304. In accordance with some embodiments, the count rates from all the time bins within time period 304 are summed and used as the inelastic count rate. The capture count rate may be the summed count rate from one or more of the time bins within time period 306. In accordance with some embodiments, the count rates from time bins within time period 306 that span 100 μs to 1000 μs after the deactivation of the neutron source 210. In some embodiments, the ratio is the inelastic count rate (or its capture background corrected value) divided by the capture count rate, and in other embodiments the ratio is the capture count rate divided by the inelastic count rate.

Figure 4:
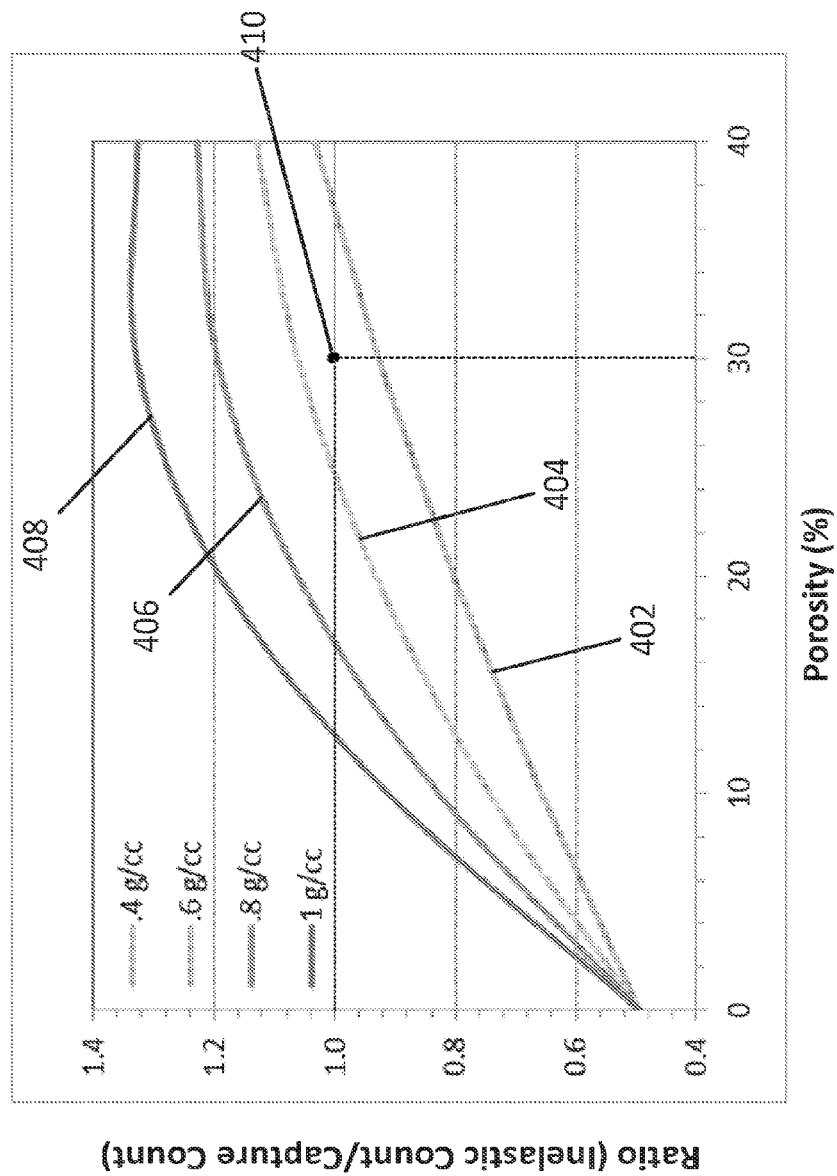
FIG. 4 shows an example relationship between ratio of inelastic count rate to capture count rate, porosity, and liquid density of a formation.

Using the ratio, a value of the liquid density of the surrounding formation may be determined based on borehole size, drilling fluid type, casing size (if present) and porosity of the surrounding formation. FIG. 4 shows an illustrative relationship between a range of possible ratios (in the illustrative form of inelastic count rate divided by capture count rate), a range of possible porosities of the formation, and the liquid density. The line 402 is representative of a liquid density of 0.4 grams per cubic centimeter (g/cc), line 404 is representative of a liquid density of 0.6 g/cc, line 406 is representative of a liquid density of 0.8 g/cc, and line 408 is representative of a liquid density of 1.0 g/cc. The relationship of FIG. 4 changes with changing borehole size, casing size and borehole fluid type; however, such parameters will be known for each situation in which the logging tool is operated. The illustrative FIG. 4 is based on a 6 inch borehole, a 4.5 inch casing, and a hydrocarbon filled borehole, where the ratio is determined based on counts measured from a single 1 inch by 6 inch scintillation detector approximately 33 inches away from the neutron source.

The relationship between a range of possible ratios, a range of possible porosities of the formation, and the liquid density may be determined using a variety of techniques. For instance, in some embodiments, the relationship is empirically determined based on previously acquired measurements. For example, the relationship may be determined based on previously acquired liquid density measurements obtained by system 100, a different liquid density measurement system, or a combination of more than one system. The relationship may be verified against a standard. For instance, in some embodiments, measurements acquired by system 100 may be compared to those obtained from one or more test scenarios in which some or all of the operational parameters and material characteristics are known. In some embodiments, the operation of system 100 may be adjusted, such that it is more accurately calibrated against known values. Calibration may be conducted before, during, or after typical operation of system 100, and the results of the calibration may be applied to past, present, or future measurements.

In some embodiments, the relationship is determined based on a simulation of the behavior of gamma emission based upon particular simulated parameters and particle behavior. For example, the behavior of emitted neutrons and resultant gamma energy may be modeled based on formation porosity and liquid density. These simulated relationships may be subsequently used to determine liquid density during operation of system 100. In some embodiments, simulated relationships may additionally be verified against empirically determined relationships, as described above.

A relationship such as that illustrated by FIG. 4 is used to determine a value indicative of liquid density using the ratio of inelastic count rate to capture count rate and the porosity. For example, if a plotted point (plotted based on a particular ratio at a particular porosity) falls on the 0.4 g/cc or 0.6 g/cc lines, then the value indicative of liquid density is 0.4 g/cc or 0.6 g/cc, respectively for the particular ratio. If a plotted point falls between the 0.4 g/cc and 0.6 g/cc lines, the value indicative of liquid density may be interpolated. In some cases, a linear relationship may exist, such that a distance between the 0.4 g/cc 0.6 g/cc lines directly indicates the value indicative of liquid density. In other cases, the relationship may be other than a linear relationship, in which case the value indicative of liquid density may be determined based on the particular relationship. For the non-linear case, the relationship may be determined (in some embodiments in advance) by any suitable method, such as modeling. Plotted points falling between other lines may be similarly interpolated in order to determine the value indicative of liquid density. In further embodiments, the liquid density determined may be considered with a liquid density value from a previous measurement of liquid density at the particular borehole depth (e.g., after depletion caused by extraction), and thus the value indicative of liquid density may be a value of a change in liquid density over time.

Consider, for purposes of explanation, that for a particular borehole depth a ratio value of approximately 1.0 is calculated, and that the porosity of the formation at the particular borehole depth is 30%. Point 410 is representative of a ratio of 1.0 and porosity of 30%. Plotted point 410 falls between 0.4 g/cc line 402 and 0.6 g/cc line 404. Based on the relationship of the actual liquid density when the ratio falls between these two density values, the value of indicative of liquid density may be determined for the particular borehole depth based on the plotted point 410. The process of obtaining the gamma count rate decay curve, calculating the ratio, and determining the value indicative of liquid density may be repeated for a plurality of borehole depths, and the values plotted. Plotting may be on chart paper with other formation parameters of interest, or the plotting may be by way of a computer monitor or other display.

The value indicative of liquid density may be used to identify different materials, or to distinguish one material from another. For example, in some embodiments, an operator may estimate the liquid density of a substance in order to identify that substance. For instance, the operator may be able to identify an unknown substance as water based on a liquid density determination of approximately 1 g/cc. Similarly, the operator may use this information to differentiate between two different substance (for instance to differentiate a hydrocarbon from water) based on a different liquid density determination. This identification and determination made be made as a function of time, a function of depth, or both.

The liquid density resolution of system 100 may depend on several factors, such as difference in densities of the different hydrocarbons, the borehole size, the size of the scintillation crystals, the distance from the scintillation crystal to the neutron source, the strength of the neutron source, the neutron emission time interval, the gamma detection time interval, or other factors. In some embodiments, system 100 has a liquid density resolution of approximately ±0.02 g/cc.

Some embodiments may be used for applications other than the identification and differentiation of liquid hydrocarbons. For instance, some embodiments may be used to differentiate between sea water and fresh water, or between fresh water and water contaminated by other substances. Accordingly, embodiments may be used for applications involving the density determination of a variety of liquid substances.

The various embodiments discussed to this point have implicitly assumed that the gamma count rate decay curves are obtained by a logging tool contemporaneously with calculating the ratio and determining the value indicative of liquid density. However, in some embodiments calculating the ratio and determining the value indicative of liquid density may take place non-contemporaneously with a logging tool obtaining the gamma count rate decay curves. Stated otherwise, the embodiments of determining a value indicative of the liquid density may take place with respect to historical logging data gathered hours, days, weeks or months in advance of the calculating the ratio and determining the value indicative of liquid density, so long as porosity values are also present, or can be calculated.

The logging tool 110 of FIG. 2 illustrates three gamma detectors 204. However, the various embodiments of calculating the ratio and determining the value indicative of liquid density utilize the gamma count rate decay curves from a single gamma detector. In some cases, the first gamma detector 204A provides better gamma count rate decay curves for determining the value indicative of liquid density. However, as the porosity of the formation surrounding the borehole increases, better gamma count rate decay curves for determining the value indicative of liquid density may be obtained from the closer spaced gamma detectors 204, for instance from the second gamma detector 204B or the third gamma detector 204C. Thus, in some embodiments, the gamma detector 204 used to read the gamma count rate decay curve for determination of the value indicative of liquid density is selected based on a value indicative of porosity. For example, if the porosity of the formation is known prior to the running the tool 110 within the borehole (i.e., the porosity is determined non-contemporaneously with obtaining the gamma count rate decay curves and held in a database), then a gamma detector 204 may be selected based on the previously determined porosity. In yet still other embodiments, though only one gamma detected 204 is needed for purposes of determining values indicative liquid density, two or more of the gamma detectors 204 may nevertheless be operational for measuring other formation parameters of interest, such as a value indicative of porosity. In embodiments where the value indicative of porosity (e.g., ratio of the capture count rate for two detectors) is measured contemporaneously with obtaining the gamma count rate decay curves, the gamma detector 204 used for determining the value indicative of liquid density may be selected based on the contemporaneously determined value indicative of porosity. Further still, over the course of a single logging run, multiple gamma detectors 204 may be used, one at a time, for determining the value indicative of liquid density based on the values indicative of porosity of the formation at different borehole depths.

Figure 5:
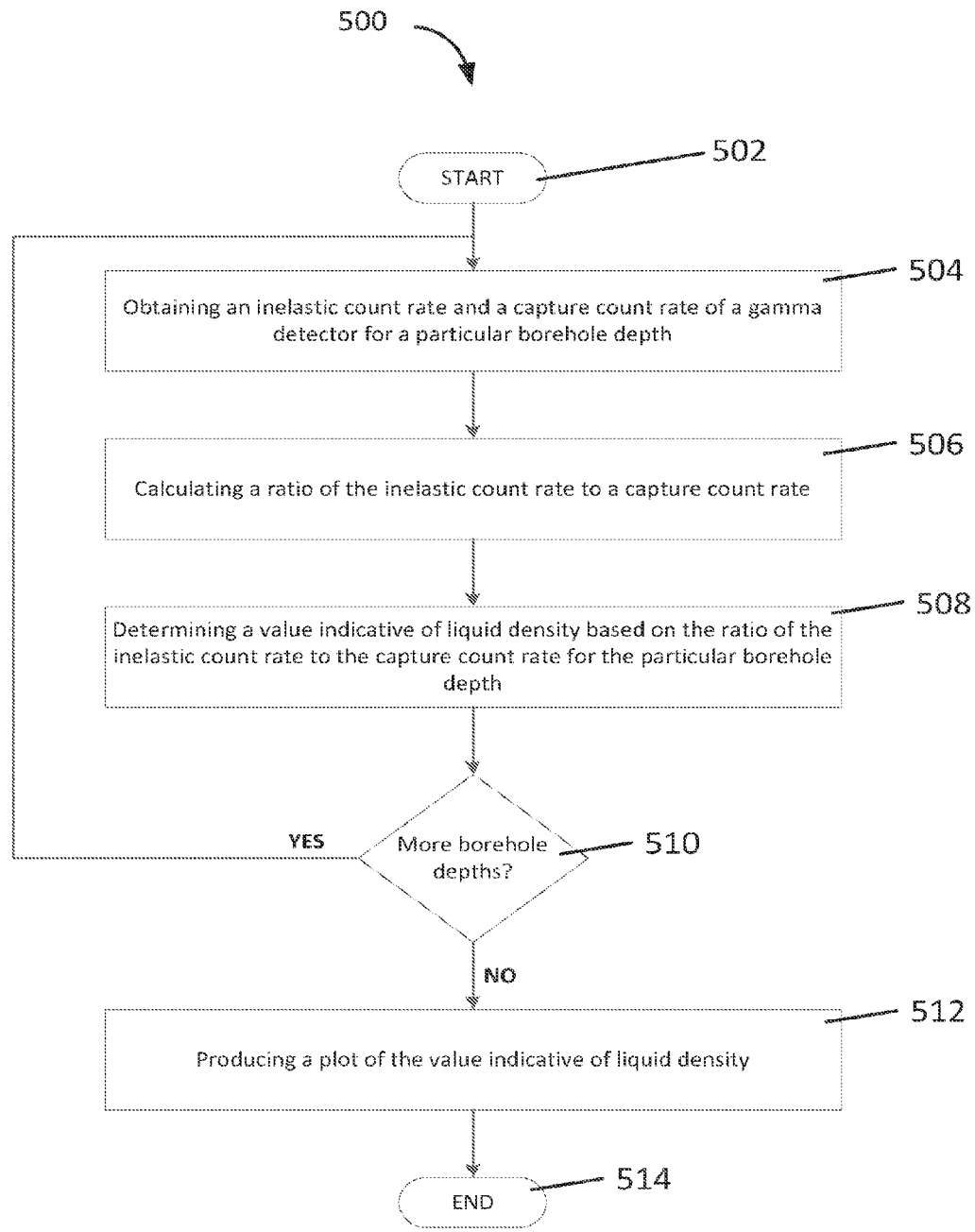
FIG. 5 shows a method in accordance with at least some embodiments.

FIG. 5 illustrates an exemplary method 500, where the method may be implemented, at least in part, by the surface computer system 122, the computer system 206 within the logging tool, or any other general purpose or special purpose computer system. In particular, the method 500 starts (block 502) and proceeds to obtaining an inelastic count rate and a capture count rate of a gamma detector for a particular borehole depth (block 504). In some embodiments, the obtaining is by operation of the nuclear logging tool contemporaneously with the further steps of the illustrative method, while in other embodiments the obtaining is from a database of gamma count rates generated based on operation of the nuclear logging tool non-contemporaneously with the further steps of the illustrative method. Regardless of the precise mechanism of obtaining the gamma count rates, the illustrative method then moves to calculating a ratio of the inelastic count rate to a capture count rate (block 506). In some embodiments the ratio is the inelastic count rate divided by the capture count rate, but in other embodiments the ratio is the capture count rate divided by the inelastic count. Next, the method moves to a determination of a value indicative of liquid density based on the ratio of the inelastic count rate to the capture count rate for the particular borehole depth (block 508). In some cases the determination of the value may be based on porosity of the formation surrounding the borehole at the particular borehole depth, such as by a relationship similar to that shown in illustrative FIG. 4. While one value indicative of liquid density at a particular borehole depth may be useful in some circumstances, in some cases the obtaining (block 504), calculating the ratio (block 506) and determining the value of liquid density (block 508) may be repeated for a plurality of borehole depths (block 510). Thereafter, a plot of the value indicative of liquid density is produced (block 512), and the illustrative method 500 ends (block 514). The plotting may take many forms. In some cases, a paper plot with the value indicative of borehole depth may be created, and in yet other cases the plot may be by way of a display device coupled to a computer system.

Figure 6:
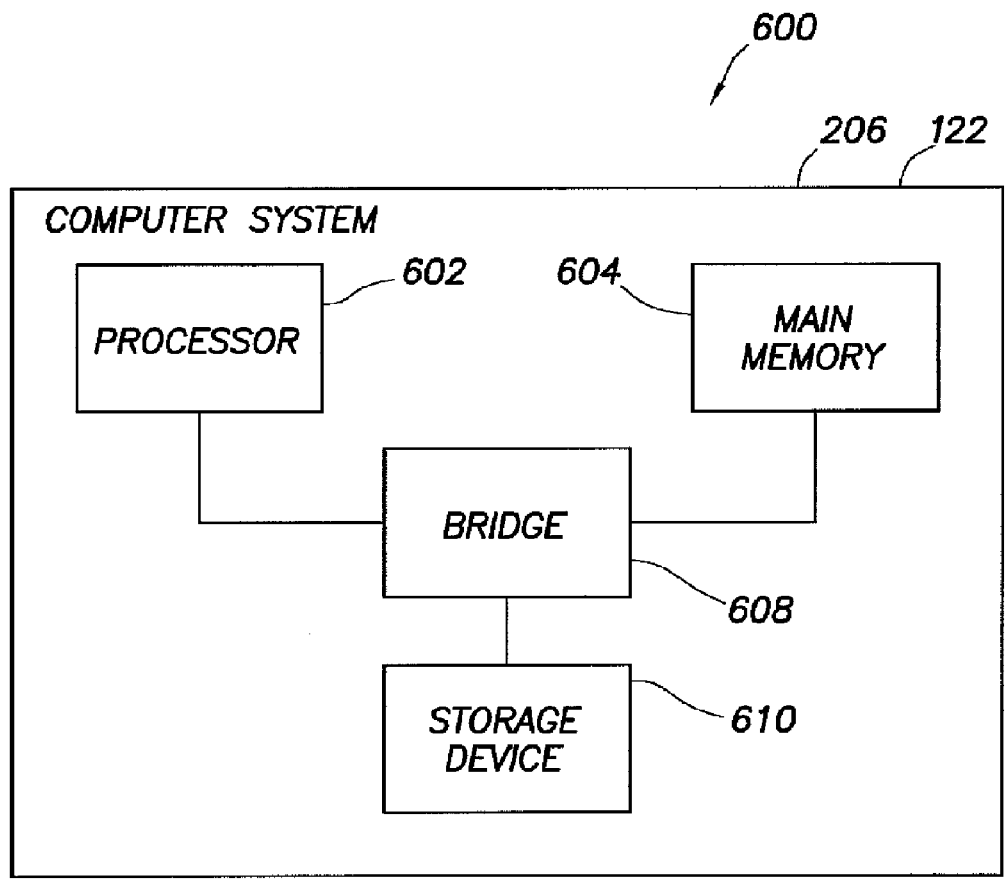
FIG. 6 shows an embodiment of a computer system.

FIG. 6 illustrates in greater detail a computer system 600, which is illustrative of both the surface computer system 122 and the computer system 206 within the logging tool 110. Thus, the computer system 600 described with respect to FIG. 6 could be proximate to the borehole during the time period within the tool 110 is within the borehole, the computer system 600 could be located at the central office of the oilfield services company, or the computer system 600 could be within the logging tool 110 (such as for LWD or MWD tools). The computer system 600 includes a processor 602, and the processor couples to a main memory 604 by way of a bridge device 608. Moreover, the processor 602 may couple to a long term storage device 610 (e.g., a hard drive) by way of the bridge device 608. Programs executable by the processor 602 may be stored on the storage device 610, and accessed when needed by the processor 602. The program stored on the storage device 610 may include programs to implement the various embodiments of the present specification, including programs to implement selecting a gamma detector to use in the liquid density determination, calculating the ratio of the inelastic gamma count rate to capture gamma count rate, calculating the value of indicative of liquid density, and producing a plot of the value indicative of liquid density. In some cases, the programs are copied from the storage device 610 to the main memory 604, and the programs are executed from the main memory 604. Thus, both the main memory 604 and storage device 610 are considered non-transitory computer-readable/machine-readable storage mediums. The ratios and values indicative of liquid density predicted by the computer system 610 may be sent to a plotter that creates a paper-log, or the values may be sent to a display device which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above described embodiments may provide various benefits over existing solutions. For example, an operator may use system 100 to determine liquid density in situ continuously along the depth of the well, rather than determine liquid density ex situ at discrete intervals, as is the case with many conventional fluid sampling tools. Thus, an operator may view information about liquid density at near-real time as the tool 110 is moved along the depth of a well structure.

Further, in certain embodiments, the system may be operated with only a single detector, thus avoiding the need for inter-detector calibration. In contrast, in traditional methods utilizing capture count-rate measurements using multiple spaced detectors, measurements from each of the detectors must be calibrated to remove sensitivity to individual detector threshold variability, and to correct drifts between the multiple detectors over time. Thus, in the above described embodiments, accurate measurements may be made without additional calibration steps.

Further, described embodiments may be less sensitive to fluid variation in the borehole compared to neutron emission-based carbon/oxygen spectroscopy techniques. Thus, these embodiments are suitable for use in heterogeneous fluid environments, and are robust against time-varying fluctuations in the composition of the borehole fluid.

The embodiments described above also have improved count-rates, and thus better precision, compared to conventional neutron emission-based carbon/oxygen logging techniques. Therefore, the desired precision for the liquid density measurement can be achieved in less time, which translates into faster overall logging speed. In some embodiments, this may alternatively or additionally mean that an increased number of measurements are taken, increasing the overall precision of the measurement technique.

Figure 7:
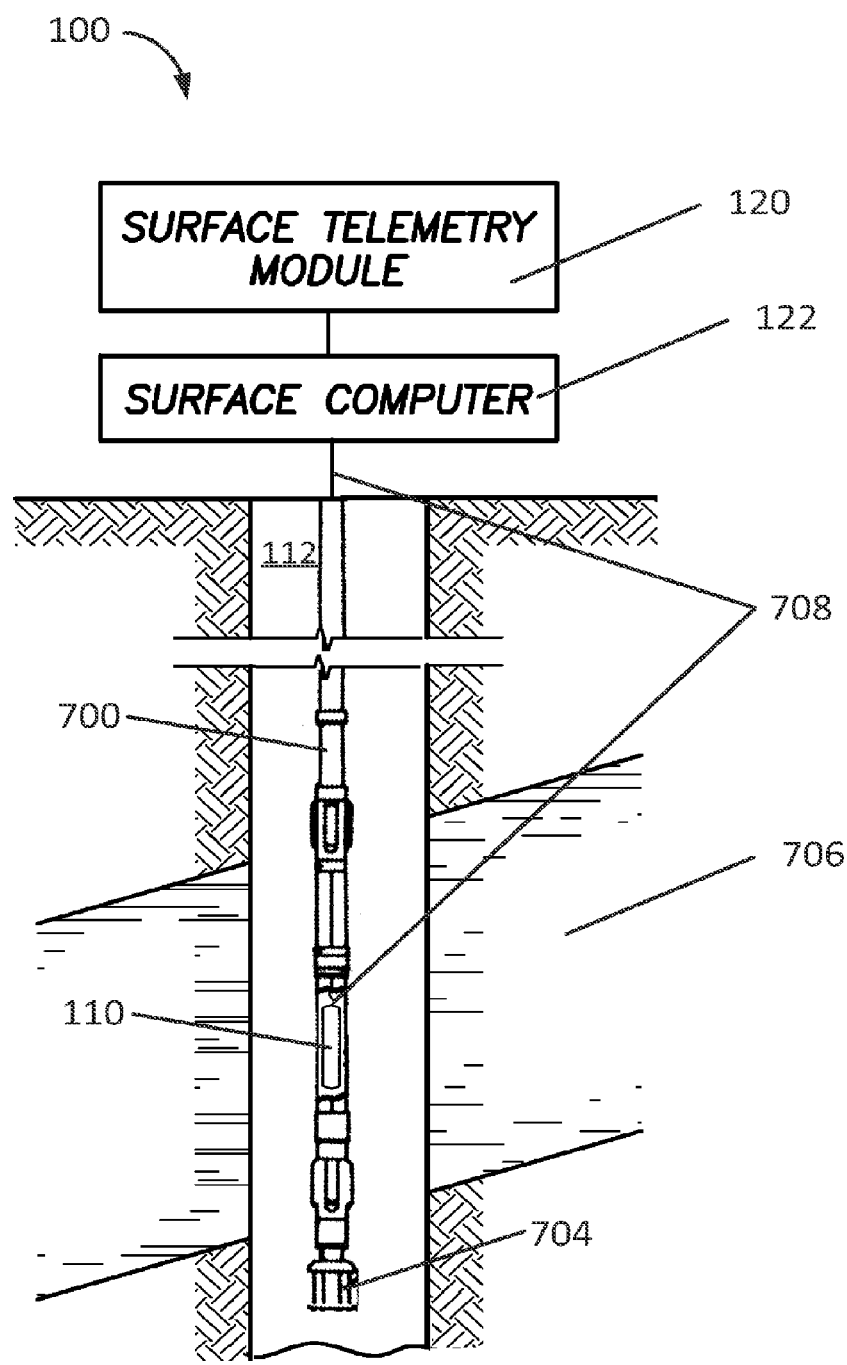
FIG. 7 shows an embodiment used with a measure-while-drilling or logging-while-drilling system.

The above discussion is meant to be illustrative of the principles and various embodiments of the present technology. Numerous variations and modifications will become apparent to those skilled in the art once the above disclosure is fully appreciated. For example, some embodiments may be used in measuring-while-drilling (MWD) and logging-while-drilling (LWD) operations. Referring to FIG. 7, an example system 100 includes a logging tool 110 mounted to a drill string 700 commonly used in MWD and LWD techniques. During operation of drill string 700, an operator may direct the depth and orientation of drill string 700 within a borehole 702 to engage a drill bit 704 with formations surrounding borehole 702. As logging tool 110 is mounted to drill string 700, it moves with drill string 700, and thus may be positioned and operated in conjunction with drill string 700 and drill bit 704. For instance, drill string 700 may be positioned such that logging tool 110 is proximate to a formation 706 of interest. Logging tool 110 may be communicatively coupled to the surface telemetry module 120 and the surface computer 122 in various ways, for instance through a wired connection, such as a cable 708 that runs the length of drill string 700. In some embodiments, logging tool 100 may communicate with the surface telemetry module 120 and the surface computer 122 through wireless data transmission methods, for instance through mud pulse telemetry, acoustic transmission, electromagnetic transmission, or other wireless communications methods.

In some embodiments, the counts associated with capture gammas are removed from the inelastic count rate, prior to calculating the ratio. In other cases, however, the presence of counts of capture gammas in the inelastic count rate, is ignored for purposes of calculating the ratio. Finally, preprocessing of the data may take place, such as dead-time correction and environmental correction, without affecting scope of this specification. It is intended that the following claims be interpreted to embrace all such variations and modifications. Accordingly, other embodiments are within the scope of the following claims.

What is claimed is:

1. A method comprising:
   obtaining an inelastic count rate and a capture count rate of a gamma detector for a particular borehole depth associated with a formation;
   calculating a ratio of the inelastic count rate to the capture count rate of the gamma detector for the particular borehole depth;
   determining a porosity for the particular borehole depth;
   determining a liquid density based on:
     the ratio of the inelastic count rate to the capture count rate of the gamma detector for the particular borehole depth,
     the porosity for the particular borehole depth, and
     a set of known relationships between the ratio of the inelastic count rate to the capture count rate of the gamma detector for the particular borehole depth, the porosity for the particular borehole depth, and the liquid density; and
   determining information concerning the liquid density of the formation as a function of borehole depth.

2. The method of claim 1, further comprising directing pulsed neutrons at the formation at the particular borehole depth.

3. The method of 1, wherein determining the porosity of the formation occurs before determining the liquid density.

4. The method of claim 1, wherein the set of known relationships is obtained based on empirically measured data.

5. The method of claim 1, wherein the set of known relationships is obtained based on simulated data.

6. The method of claim 1, wherein the liquid density is a density of a liquid hydrocarbon.

7. The method of claim 1, further comprising emitting neutrons from a neutron source.

8. The method of claim 1, further comprising fitting the inelastic count rate and/or the capture count rate to one or more modeling curves.

9. The method of claim 1, wherein determining information concerning the liquid density of the formation as a function of borehole depth comprises plotting the liquid density as a function of borehole depth.

10. A system comprising:
a tool comprising a source of pulsed neutrons and a gamma detector, where the gamma detector counts gamma arrivals; and
a processor coupled to a memory, and the processor coupled to the gamma detector;
wherein the memory stores a program that, when executed by the processor, causes the processor to:
calculate a ratio of an inelastic count rate to a capture count rate of the gamma detector for a particular depth within a borehole; and
determine a liquid density for the particular depth based on the ratio, a porosity for the particular borehole depth, and a set of known relationships between the ratio, the porosity, and the liquid density.

11. The system of claim 10, wherein the system contains more than one gamma detector.

12. The system of claim 11, wherein the ratio of inelastic count rate to the capture count rate is calculated with respect to a subset of the gamma detectors.

13. The system of claim 10, wherein the distance between source of neutrons and one of the gamma detectors is approximately 1 foot, 2 feet, or three feet.

14. The system of claim 10, wherein the program further causes the processor to fit the inelastic count rate and/or the capture count rate to one or more modeling curves.

15. The system of claim 10, wherein the liquid density is a density of a liquid hydrocarbon.

16. The system of claim 10, where in the gamma detector comprises a yttrium/gadolinium silicate scintillation crystal, sodium iodide scintillation crystal, lanthanum bromide scintillation crystal, or a bismuth germinate scintillation crystal.

17. The system of claim 10, wherein the processor and the memory and located outside of the borehole.

18. A computer-readable storage media storing a program that, when executed by a processor, causes the processor to:
obtain an inelastic count rate and a capture count rate of a gamma detector for a particular borehole depth associated with a formation;
determine a porosity for the particular borehole depth;
calculate a ratio of the inelastic count rate to the capture count rate of the gamma detector for the particular borehole depth;
determine a liquid density based on:
the ratio of the inelastic count rate to the capture count rate of the gamma detector for the particular borehole depth,
the porosity for the particular borehole depth, and
a set of known relationships between the ratio of the inelastic count rate to the capture count rate of the gamma detector for the particular borehole depth, the porosity for the particular borehole depth, and the liquid density; and
determine information concerning the liquid density of the formation as a function of borehole depth.

19. The computer-readable storage media of claim 18, wherein the program causes the processor to determine the porosity of the formation before the processor determines the liquid density.

20. The computer-readable storage media of claim 18, wherein the liquid density is a density of a liquid hydrocarbon.

21. The computer-readable storage media of claim 18, wherein the program further causes the processor to initiate an emission of neutrons from a neutron source.

22. The computer-readable storage media of claim 18, wherein the program further causes the processor to fit the inelastic count rate and/or the capture count rate to one or more modeling curves.

23. The computer-readable storage media of claim 18, wherein the program further causes the processor to plot the information concerning the liquid density of the formation as a function of borehole depth.

* * * * *